US012456346B2

(12) United States Patent
Higgins et al.

(10) Patent No.: US 12,456,346 B2
(45) Date of Patent: Oct. 28, 2025

(54) METHODS AND SYSTEMS FOR VIRTUAL GAMING ASSET ALLOCATION

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 401 days.

(21) Appl. No.: 18/080,007

(22) Filed: Dec. 13, 2022

(65) Prior Publication Data

US 2024/0194024 A1 Jun. 13, 2024

(51) Int. Cl.
*G07F 17/32* (2006.01)

(52) U.S. Cl.
CPC ...... *G07F 17/3241* (2013.01); *G07F 17/3204* (2013.01)

(58) Field of Classification Search
CPC ............. G07F 17/3241; G07F 17/3204; G07F 17/3211
See application file for complete search history.

(56) References Cited

U.S. PATENT DOCUMENTS 8,147,334 B2 4/2012 Gatto et al.
8,764,566 B2 7/2014 Miltenberger et al.
2010/0081508 A1* 4/2010 Bhogal .................... A63F 13/75 463/40
2012/0040751 A1* 2/2012 Peters ...................... G07F 17/32 463/29
2013/0086488 A1* 4/2013 Piccionelli .......... G06F 3/04815 715/753
2014/0038709 A1* 2/2014 Earley ................. G07F 17/3272 463/31
2015/0221183 A1* 8/2015 Colvin ................ G07F 17/3211 463/11
2016/0210712 A1* 7/2016 Jamieson ................ G07F 9/001
2016/0345176 A1* 11/2016 DeWitt ................. H04W 4/021

* cited by examiner

*Primary Examiner* — James S. McClellan
(74) *Attorney, Agent, or Firm* — Sheridan Ross P.C.

(57) ABSTRACT

Embodiments of the present disclosure are directed to facilitating access to assets in a virtual and/or real-life gaming environment. For example, allocating assets in a Virtual Reality (VR) environment can comprise providing, to a VR user device, a representation of a virtual casino including a virtual asset, receiving, from the VR user device, a request to utilize the virtual asset, and performing a validation process on the request to utilize the virtual asset. In response to successful completion of the validation process, an electronic record associated with the virtual asset can be updated to indicate allocation of the virtual asset to a user of the VR user device. For example, allocating the virtual asset to the user of the VR user device can comprise allowing an avatar for the user to sit at a virtual gaming machine in the virtual casino.

20 Claims, 7 Drawing Sheets

METHODS AND SYSTEMS FOR VIRTUAL GAMING ASSET ALLOCATION

BACKGROUND

The present disclosure is generally directed to enhancing a gaming experience in virtual reality and augmented reality environments and, in particular, toward facilitating access to assets in a virtual and/or real-life gaming environment.

In a real-life casino, any number of Electronic Gaming Machines (EGMs), other electronic gaming systems, table games, kiosks, etc. are available for user by users. To access these assets of the gaming venue, a user typically must be of at least a certain age, e.g. 18 or 21 years old depending upon the location. In the virtual world, such restrictions still apply but become more difficult to enforce. Additionally, in either a real-life or virtual casino, some games are more popular than others and access to these assets may be in high demand. Hence, there is a need for improved methods and systems for allocating assets in in a virtual and/or real-life gaming environment.

BRIEF SUMMARY

Embodiments of the present disclosure are directed to facilitating access to assets in a virtual and/or real-life gaming environment. According to one embodiment, a method for allocating assets in a Virtual Reality (VR) environment can comprise providing, to a VR user device, a representation of a virtual casino, the virtual casino comprising a virtual asset, receiving, from the VR user device, a request to utilize the virtual asset, and performing a validation process on the request to utilize the virtual asset. Performing the validation process can comprise one or more of determining whether the user of the VR user device is registered in the VR system, performing the validation process comprises determining whether the user of the VR user device is at least a minimum age, and/or performing the validation process comprises verifying an identity of the user of the VR user device.

In response to successful completion of the validation process, an electronic record associated with the virtual asset can be updated to indicate allocation of the virtual asset to a user of the VR user device. For example, allocating the virtual asset to the user of the VR user device can comprise reserving the virtual asset for use by the user of the VR user device. In another example, allocating the virtual asset to the user of the VR user device can comprise defining a personal zone around a virtual representation of the user of the VR user device within the virtual casino. In yet another example, allocating the virtual asset to the user of the VR user device can comprise defining boundaries and rules for the virtual asset.

According to another embodiment, a VR system can comprise a processor and a memory coupled with and readable by the processor. The memory can store therein a set of instructions which, when executed by the processor, causes the processor to provide, to a VR user device, via a communications network, a representation of a virtual casino including a virtual asset, receive, from the VR user device, via the communications network, a request to utilize the virtual asset, and perform validation process on the request to utilize the virtual asset. In some cases, the instructions can further cause the processor to maintain an electronic record defining an account for the user of the VR user device and performing the validation process based on the maintained electronic record.

In response to successful completion of the validation process, the instructions can further cause the processor to update an electronic record associated with the virtual asset to indicate allocation of the virtual asset to a user of the VR user device. For example, the virtual asset can comprise a seat at a virtual gaming system in the virtual casino. In such cases, allocating the virtual asset to the user of the VR user device can comprise allowing an avatar representing the user of the user device in the virtual casino to sit at the virtual gaming system.

In some cases, the instructions can further cause the processor to define a personal zone around an avatar representing the user of the VR user device within the virtual casino and prevent avatars of other users in the virtual casino from entering the defined personal zone around the avatar representing the user of the VR user device. A size of the personal zone around the avatar representing the user of the VR user device can be determined, for example, based on any one or more of predefined preferences for the user of the VR user device, a status for the user of the VR user device, a history for the user of the VR user device, and/or a location of the avatar for the user of the VR user device in the virtual casino.

According to yet another embodiment, an Augmented Reality (AR) system can comprise a processor and a memory coupled with and readable by the processor. The memory can store therein a set of instructions which, when executed by the processor, causes the processor to provide, to an AR user device, via a communications network, an augmented representation of a gaming venue including an asset, receive, from the AR user device, via the communications network, a request to utilize the asset, perform validation process on the request to utilize the asset and in response to successful completion of the validation process, update an electronic record associated with the asset to indicate allocation of the asset to a user of the AR user device.

For example, the asset can comprise a gaming system of the gaming venue and allocating the asset to the user of the user device can comprise allowing the user of the user device to sit at the gaming system. In another example, allocating the asset to the user of the AR user device comprises reserving the gaming system for the user of the AR user device. In such cases, reserving the gaming system for the user of the AR user device can be based on a set of parameters for the user of the AR user device, for example. The instructions further cause the processor to receive a request to cancel reservation of the asset for the user of the AR user device and determine whether to cancel reservation of the asset for the user of the AR user device, for example, based on a set of parameters for the user of the AR user device and a set of parameters for the request.

Additional features and advantages are described herein and will be apparent from the following Description and the figures.

DETAILED DESCRIPTION

Embodiments of the present disclosure are directed to facilitating access to assets in a virtual and/or real-life gaming environment. More specifically, embodiments described herein involve the use of Virtual Reality (VR) or Augmented Reality (AR) in a casino environment to allocate assets such as virtual and/or real gaming machines, table, sport wagering terminals, etc. While various embodiments described herein refer to Electronic Gaming Machines (EGMs), assets to which embodiments apply other than EGMs can include, but are not limited to, sports wagering terminal, kiosks, table games, the casino floor, shopping or other services of the property, such as a restaurant or retail store, etc.

Figure 1:
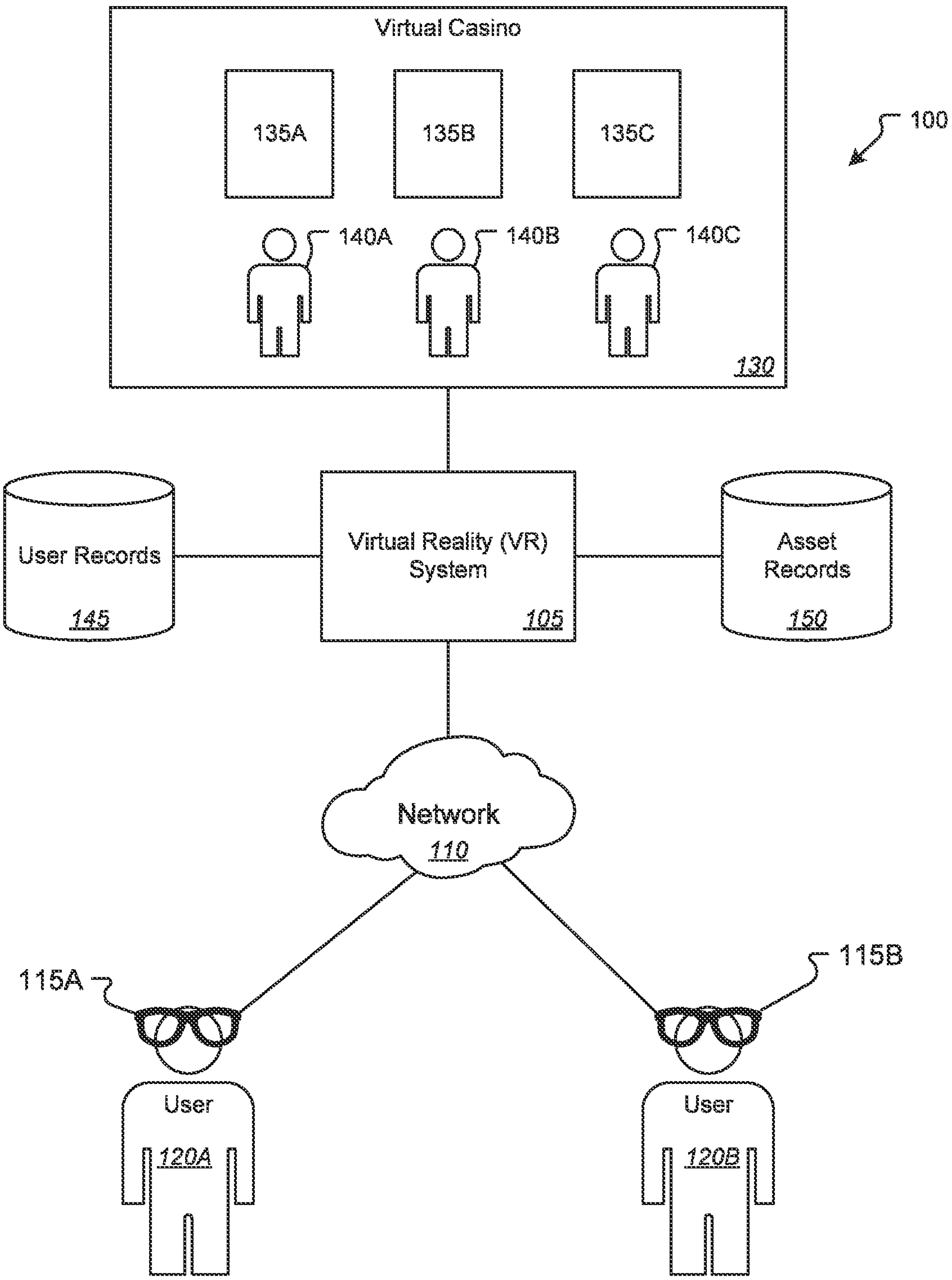
FIG. 1 is a block diagram illustrating elements of an exemplary environment for implementing a virtual casino according to one embodiment of the present disclosure.

FIG. 1 is a block diagram illustrating elements of an exemplary environment for implementing a virtual casino according to one embodiment of the present disclosure. As illustrated in this example, the environment 100 can include a VR system 105 communicatively coupled with a communications network 110. The communications network 110 can comprise any one or more wired and/or wireless local area and/or wide area networks as known in the art. Also coupled with the communications network 110 can be any number of VR user devices 115A 115B such a hearable headset, glasses, etc. as known in the art.

Through the VR devices 115A and 115B, the VR system 105 can provide to users 120A and 120B a representation of a virtual casino 130. The virtual casino can comprise one or more assets 135A-135C such as virtual Electronic Gaming Machines (EGMs) or other virtual gaming systems and each user can be represented by an avatar 140A and 140B. Through the VR devices 115A and 115B, the VR system 105 can allow the users 120A and 120B to move their avatars 140A and 140B around the virtual casino, interact with the virtual gaming systems or other assets 135A-135C, interact with each other, etc. For example, a user 120A can manipulate his avatar 140A to interact with an asset 135A such as a virtual gaming system to play an electronic game such as slots, video poker, a table game, or any other casino game.

In the real world, social norms, rules and casino policies govern how a user is able to act, while in the virtual world these rules are left to the creator of the virtual casino. As a simple example, a user may only sit at an EGM where no other user is sitting and should not sit on the lap of a stranger to play the same EGM.

In a virtual casino 130, a user may be required by the VR system 105 to engage or occupy a designated seat or location in order play a gambling game, or place a wager. For example, a user's 120A avatar 140A may need to sit at a designated seat (or are to stand, etc.) of a table game or other virtual asset 135A in order to participate in that table game (place a bet, perform a chip buy-in, etc.). Likewise, a user's 120A avatar 140A may need to sit (or stand, etc.) at a seat or designated area of an EGM in order to play that EGM, deposit funds into that EGM, etc. According to embodiments of the present disclosure, the user 120A takes an action, called a "gambling seat engagement" action, to take control and occupy a virtual asset 135A. The VR system 105 can allow the user's avatar 140A to occupy that seat once the user's request is approved, or decide to not allow the avatar 140A to occupy that seat or designated gambling position. The VR system 105, upon receiving the request or action, may validate some information associated with the user 120A, or information included with the request, based on a set of maintained user records 145 in order to determine if the user 120A should be granted access to that virtual asset 135A. For example, the user's request may include an identifier associated with their registered account and the VR system 105 may validate that the requesting user 120A is of age (ex: 21 years or older) and has been properly registered and Know Your Customer (KYC) checks have been performed, etc. In another example, a determination can be made as to whether the player meets any geolocation requirements. For example, a VR player in Nevada might be able to engage the seat of an EGM, but a VR user who is geolocated to be connecting from California may not be able to engage the seat of an EGM. If the user 120A meets the requirements of the VR system 105, then the system 105 can allow the user's avatar 140A to sit down or otherwise occupy that asset 135A. If the user 120A does not meet the requirements, then the VR system 105 can reject their action request, and in some embodiments, the VR system 105 may return an error message, or error code or error status that can be used to describe to the user 120A through the VR user device 115A why they cannot occupy that asset 135A. For example, the user 120A may not have registered for an account and therefore no user record 145 exists or may be the user 120A did not complete a required KYC step, etc.

In some embodiments, the VR system 105 may enforce additional requirements for a user's "gambling seat engagement" action to be approved. For example, in the high-limit room, the VR system 105 may require the user's rank to be of a certain level in order to allow the user to occupy a seat. In another embodiment, the VR system 105 may require the user to have wagered a certain amount in a previous time period (day, week, month, etc.), or have qualified for a promotion or other marketing offer, etc. In another example, the user may have to be approved by a casino staff member, such as a casino host. The user may have to have an active casino line of credit or casino wallet balance over a certain amount, etc.

Certain types of virtual users may have different engagement requirements. For example, a virtual employee may have a different set of requirements from a player user. Likewise, a regulator may have a different set of requirements from a player.

In one embodiment, the VR system 105 can allow a user 120A to reserve an asset such as a seat at a table, EGM, kiosk, sports wagering terminal, etc. A set of asset records 150 may be maintained by the VR system 105 in which indication of which assets are used and/or reserved by users can be stored. A user might reserve an EGM for various reasons such as wanting to use another virtual asset. Another reason might be to achieve some type of status to other virtual users. This status comes from the fact that the machine might be reserved for Bob, but the machine might also appear different or unique for Bob, thus increasing the status. The reservation could be made at the virtual asset 135A through the visual interface of the VR user device 115A using a joystick, hand gestures, voice commands or facial recognition (movements of the face to confirm or navigate the UI).

After the asset 135A is reserved, other users cannot use it. Other users might see a visual (virtual) representation that the asset is reserved. The indication could be colors, picture, or text. The indication could include the person who reserved the asset ("Reserved for Bob"). The indication could include some indication of when the reservation will expire. The indication might include status information about the user such as "Bob is a gold member" to promote status and inform users that club members have the ability to reserve machines.

The ability to reserve the asset 135A might be based on information from the user records 145 such as user loyalty club status (gold, silver, bronze etc.). The ability might be reversed for users with a certain amount of play (amount wagered, won, lost) over a period of time (such as over the past hour). The ability might be based on the type of play such as the denomination, game type (Poker, slot, sports wagering), or play rate (number of games played per hour). The ability might be based on the time of day or play activity level of the casino to respond to more or less assets being available. The ability or inability to reserve might also be tied to a user's previous reserving behavior such as users who tend to reserve seats and not use them or not use them for an extended period of time. Similarly, the amount of time the user can reserve the asset might be based on the same parameters described for the ability to reserve.

The user, casino staff, regulator, gaming asset or some host system can all reserve an asset but can also cancel a reservation. The casino staff might cancel the reservation using VR or a computing device in response to some information such as the user has left the gaming area or is talking with some friends. The host system might cancel or change (increase or decrease the time reserved) the reservation duration in response to increased or decreased user activity in the casino.

Because the world is virtual and possibly endless, some assets might be reserved for long periods of time, such as for a year. A casino might do this for status and advertising. For example, a virtual casino might reserve a table seat for a celebrity such a Dwayne "The Rock" Johnson. The reservation advertises that the casino is popular, and celebrities might show up and gamble here.

In one embodiment, other users can request to release the reservation. For example, Mary might go to a seat at a craps table and see that a seat is reserved. Mary might have the option to request the reservation be removed. The ability to request the removal might be tied to user loyalty account status or amount of user activity (e.g., frequent customer or high roller). In one embodiment the request goes to Bob who is reserving the seat. Bob can approve or deny the request using the interface of his VR user device 115A. In one embodiment, the VR system 105 can decide whether to remove the reservation and might take parameters into account such as each user's play level, account status and previous interactions in the casino. In one embodiment, the request can be processed by a human to decide the result. In another embodiment, the VR system 105 can execute an algorithm that grants the removal of the reservation based on the number of users who request it. For example, Bob reserved the seat, but 3 users ask to remove the reservation (over some period of time, such as within 15 minutes) so the VR system 105 can break the reservation. When the reservation is removed, the VR system 105 might offer the seat to the first person who requested the removal. In another embodiment, the breaking of a reservation might require the user requesting the reservation to be broken to spend some form of casino balance, such as 500 points, or an amount from the user's cashless wagering account to request the reservation to be broken.

In the VR world, a casino might not want users bumping into each other, so the world has a personal zone around users to keep them apart. The zone area could be the same for every user, or the zone could be configured by each user. For example, Dwayne is social and would like the smallest zone of 1 foot, while Bob likes his privacy and sets his zone to 10 feet. The VR world would prevent people from coming any closer than 10 feet to Bob. Virtual world celebrities might have zones also to avoid or encourage virtual interactions with fans. The ability to set the zone and the parameters might be tied to a user loyalty account status, gaming activity, amount gambled, etc. The zone might adjust based on the location (increase by the pool, but decrease at a table game), either automatically by the VR world or based on user preferences. For example, a user might want a 10-foot zone and that can be honored by the pool, but once the user sits at a table the zone must be reduced to 2 feet.

The VR system 105 might indicate the zone changes to the users. The zone configuration might inform the user of these restrictions. For example, Dwayne tries to enter a personal zone of 10 feet and the UI informs Dwayne that 10 feet will not be honored at a poker table or that Dwayne may no longer be able to play poker.

The virtual world might adjust to honor a person's personal space. For example, Dwayne wants a personal space of 5 feet, so the virtual world spaces out the seating at a poker table such that the people are 5 feet from Dwayne. EGMs can be moved or spaces likewise can be added between EGMs in order to accommodate the desired personal zones of a user.

The user personal zone may adjust based upon whether or not the user is associated with a designated spot at a gambling game. For example, the user may not have a personal zone until they sit at a virtual EGM and have reserved that seat, or they are sitting at a table game and have reserved that seat. The size of the personal space could also expand or contract from the player's desired amount while they are gambling. For example, if a player must gamble $20 every 30 minutes to have the personal zone be equal to 5 feet, then if they end up only gambling $10 every 30 minutes, their personal zone may be less than requested (such as 2.5 feet).

Casino employees can also be virtual and may have personal zones as well for safety of the employee, integrity of a game, or safety for virtual representations of cash or funds at the casino. For example, a virtual casino employee may have to transport virtual chips from the cage to a table in order to re-plenish chips at a table, and that employee may have a personal zone in order to prevent other virtual users from attempting to take those chips during transport. A dealer at a table may have a personal zone to prevent other users from attempting to steal a deck of cards, or chips owned by the dealer, etc.

The virtual world can be fun because virtual users can do anything without concern for personal harm or violating laws or social norms. This might be encouraged, to some extent, in the virtual world, with some boundaries. The virtual casino 130 might mark certain assets with special boundaries to avoid user from jumping on a poker table, moving the chairs at a poker table or EGM, flipping over a table, moving the table or EGM, breaking the table or EGM, etc.

Virtual casino staff or virtual regulators might be allowed to violate the personal zones and gaming boundaries to support their job role. Casino staff might be able to move a table, as an example.

Figure 2:
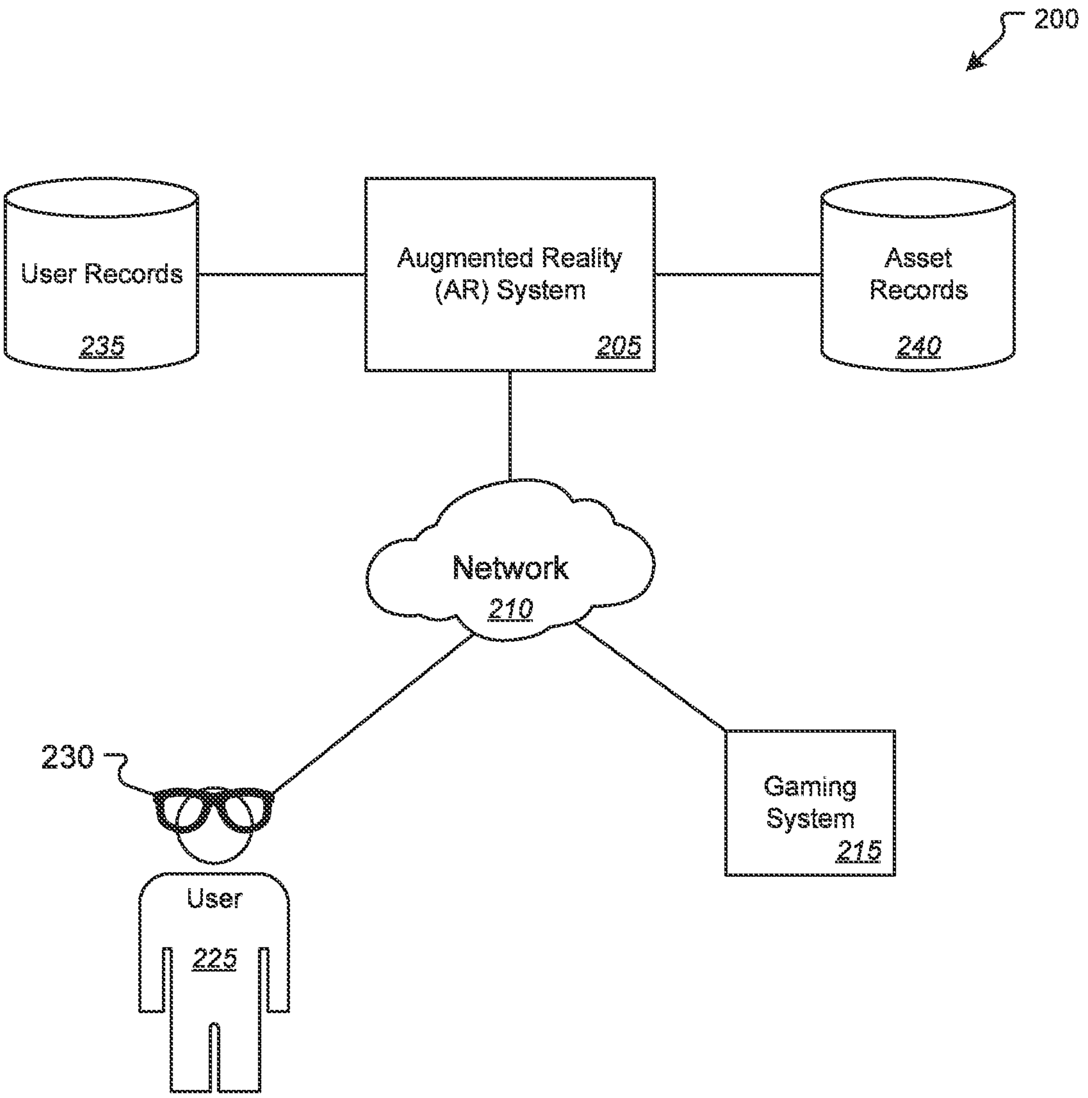
FIG. 2 is a block diagram illustrating elements of an exemplary environment for providing augmented reality enhancements according to one embodiment of the present disclosure.

FIG. 2 is a block diagram illustrating elements of an exemplary environment for providing augmented reality enhancements according to one embodiment of the present disclosure. As illustrated here, the environment 300 can comprise an AR system 205 communicatively coupled with a communications network 210. The communications network 210 can comprise any one or more wired and/or wireless local area and/or wide area networks as known in the art. One or more physical gaming systems 215 can also be communicatively coupled with the communications network 210. The gaming system can comprise, for example, an EGM, an electronic table game, a kiosk, etc. installed in a casino or other gaming venue. Through the gaming system 215 a user 225 can play any of a number of commonly known casino games.

Also coupled with the communications network 210 can be any number of AR user devices 230 such a hearable headset, glasses, etc. as known in the art. Generally speaking, the AR system 205 can provide various visual and audio enhancements to a user 225 wearing the AR user device 230. In some embodiment, users may leverage AR user devices 230 in order to play AR-enabled aspects of one or more EGMs, one or more table games, etc. Within a physical casino environment, the AR system 205 can communicate with a user's 225 AR user device 230 in order to allow the user 225 to reserve an asset such as the gaming system 215 in a manner as described above for the virtual casino 130 but in the real world. As with the virtual casino 130 example, the reservations can be validated and made based on user records 235 and asset records 240 maintained by the AR system 205.

Figure 3:
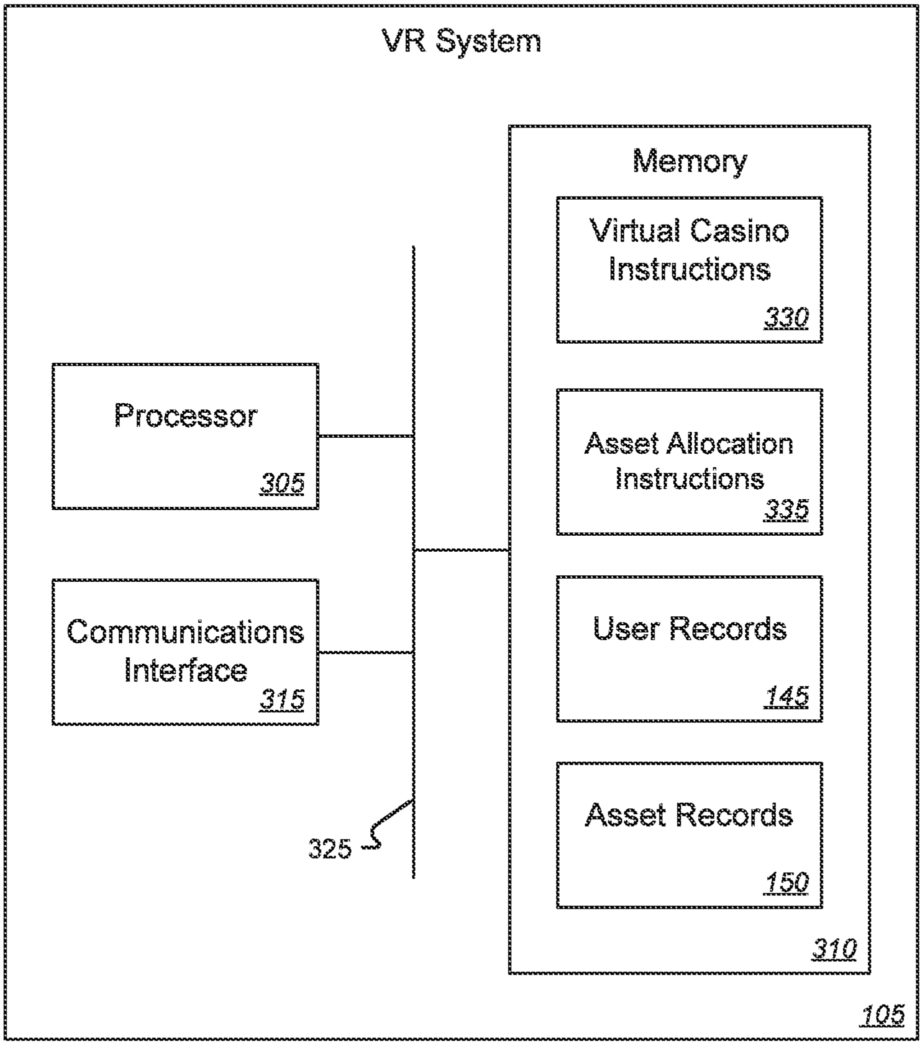
FIG. 3 is a block diagram illustrating additional details of components of an exemplary virtual reality system according to one embodiment of the present disclosure.

FIG. 3 is a block diagram illustrating additional details of components of an exemplary virtual reality system according to one embodiment of the present disclosure. As illustrated in this example, the VR system 105 can comprise a processor 305. The processor 305 may correspond to one or many computer processing devices. For instance, the processor 305 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 305 may be provided as a microprocessor, Central Processing Unit (CPU), or plurality of microprocessors that are configured to execute the instructions sets stored in a memory 310. Upon executing the instruction sets stored in memory 310, the processor 305 enables various functions of the VR system 105 as described herein.

The memory 310 can be coupled with and readable by the processor 305 via a communications bus 325. The memory 310 may include any type of computer memory device or collection of computer memory devices. Non-limiting examples of memory 310 include Random Access Memory (RAM), Read Only Memory (ROM), flash memory, Electronically-Erasable Programmable ROM (EEPROM), Dynamic RAM (DRAM), etc. The memory 310 may be configured to store the instruction sets depicted in addition to temporarily storing data for the processor 305 to execute various types of routines or functions.

The processor 305 can also be coupled with one or more communications interfaces 315. The communication interfaces 315 can comprise, for example, Ethernet, Bluetooth, WiFi, or other type of wired or wireless communications interfaces.

The memory 310 can store therein a set of virtual casino instructions 330 which, when executed by the processor 305, causes the processor 305 to provide, via the communications interface 315, to a plurality of user devices 115A and 115B, a representation of the virtual casino 130. The virtual casino instructions 330 can cause the processor 305 to represent a user 120A and 120B of each of the plurality of user devices 115A and 115B by an avatar 140A and 140B in the virtual casino 130. The virtual casino instructions 330 can cause the processor 305 to further represent a number of virtual assets 135A-135C in the virtual casino 130. These virtual assets can include, but are not limited to any number of virtual EGMs, virtual table games, etc.

The memory 310 can also store therein a set of asset allocation instructions 335 which, when executed by the processor 305, causes the processor 305 to receive, from the VR user device 115A, via the communications interface 315, a request to utilize a virtual asset 135A, and perform a validation process on the request to utilize the virtual asset 125A. For example, the asset allocation instructions 335 can further cause the processor 305 to maintain an electronic user record 145 in the memory 310. The electronic user record 145 can define an account for the user 120A of the VR user device 115A and performing the validation process can be based on the maintained electronic user record 145. More specifically, performing the validation process can comprise one or more of determining whether the user 120A of the VR user device 115A is registered in the VR system 115A based on whether a user record 145 for the user 120A exists, determining whether the user 120A of the VR user device 115A is at least a minimum age based on the user record 145, and/or verifying an identity of the user 120A of the VR user device 115A based on the user record 145 and information provided by the user 120A.

In response to successful completion of the validation process, the asset allocation instructions 335 can cause the processor 305 to update an electronic asset record 150 associated with the virtual asset to indicate allocation of the virtual asset 135A to the user 120A of the VR user device 115A. For example, allocating the virtual asset 135A to the user 120A of the VR user device 115A can comprise allowing an avatar 140A representing the user 120A in the virtual casino 130 to sit at the virtual gaming system or reserving the virtual asset 135A for use by the user 120A. In another example, allocating the virtual asset 135A to the user 120A of the VR user device 115A can comprise defining a personal zone around a virtual representation, i.e., the avatar 140A of the user 120A within the virtual casino 130. In yet another example, allocating the virtual asset to the user 120A of the VR user device 115A can comprise defining boundaries and rules for the virtual asset 135A.

In some cases, the asset allocation instructions 335 can further cause the processor 305 to define a personal zone around an avatar 140A representing the user 120A within the virtual casino 130 and the virtual casino instructions 330 can further cause the processor 305 to prevent avatars 140B and 140C of other users in the virtual casino 130 from entering the defined personal zone around the avatar 140A representing the user 120A. A size of the personal zone around the avatar 140A representing the user 120A can be determined, for example, based on any one or more of predefined preferences for the user 120A stored in the user record 145, a status for the user 120A stored in the user record 145, a history for the user 120A stored in the user record 145, and/or a location of the avatar 140A for the user 120A in the virtual casino 130.

Figure 4:
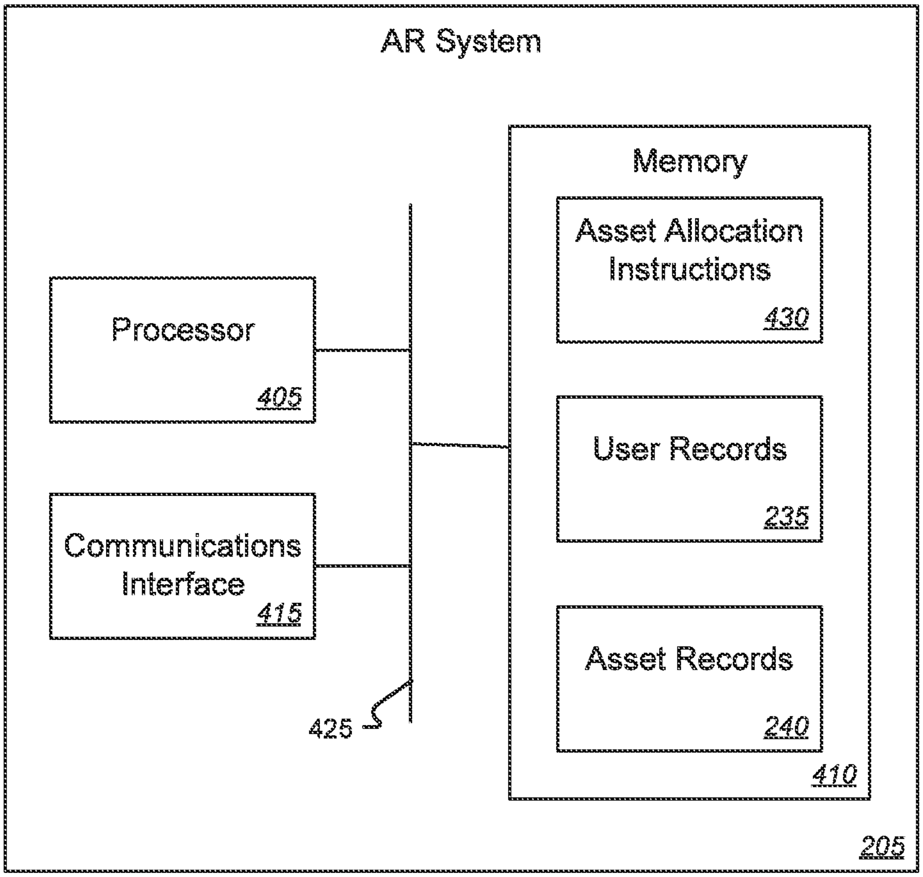
FIG. 4 is a block diagram illustrating additional details of components of an exemplary augmented reality system according to one embodiment of the present disclosure.

FIG. 4 is a block diagram illustrating additional details of components of an exemplary augmented reality system according to one embodiment of the present disclosure. As illustrated in this example, the AR system 205 can comprise a processor 405 such as any of the various types of processors described above. A memory 410 can be coupled with and readable by the processor 405 via a communications bus 425. The memory 410 can comprises any one or more of the different types of volatile and/or non-volatile memories described above. The processor 405 can also be coupled with one or more communication interfaces 415 via the communications bus 425. The communication interfaces 415 can comprise, for example, Ethernet, Bluetooth, WiFi, or other type of wired or wireless communications interfaces.

The memory 410 can store therein a set of asset allocation instructions 430 which, when executed by the processor 405, causes the processor 405 to receive, from the AR user device 230A, via the communications interface 415, a request to utilize the asset, e.g., a gaming system 215, perform a validation process on the request to utilize the asset and in response to successful completion of the validation process, update an electronic asset 240 record associated with the asset to indicate allocation of the asset to a user 225 of the AR user device 230. Performing the validation process can comprise one or more of determining, based on a set of user records 235 maintained in the memory 410, whether the user 225 is registered in the AR system 205, i.e., whether a user record 235 exists for the user, determining from the user records 235 whether the user 225 is at least a minimum age, and/or verifying an identity of the user 225 based on information in the user records 235 and information provided by the user 225.

In response to successful completion of the validation process, the asset allocation instructions 430 can cause the processor 405 to update an electronic asset record 240 associated with the asset to indicate allocation of the asset to the user 225. For example, allocating the asset to the user 225 can comprise allowing the user 225 to sit at the gaming system 215. In another example, allocating the asset to the user 225 can comprise reserving the gaming system 215 for the user 225. In such cases, reserving the gaming system for the user of the AR user device can be based on a set of parameters for the user 225 stored in the user records 235. The asset allocation instructions 430 further cause the processor 405 to receive, through the communications interface 415 a request to cancel the reservation of the asset for the user 225 and determine whether to cancel reservation of the asset for the user 225, for example, based on a set of parameters for the user 225 from the user records 235 and a set of parameters for the request.

Figure 5:
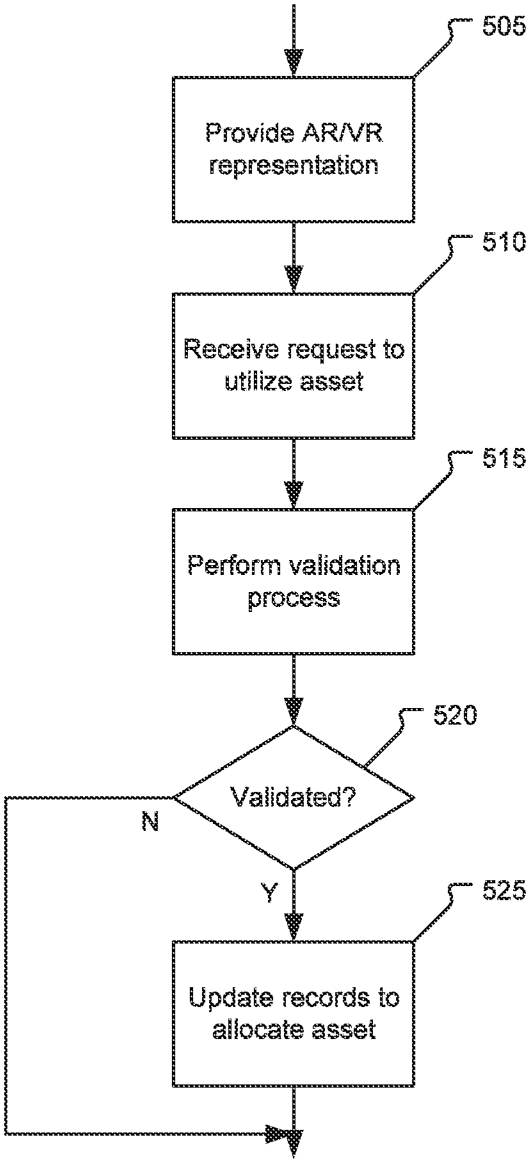
FIG. 5 is a flowchart illustrating an exemplary process for asset allocation in a virtual or augmented reality gaming environment according to one embodiment of the present disclosure.

FIG. 5 is a flowchart illustrating an exemplary process for asset allocation in a virtual or augmented reality gaming environment according to one embodiment of the present disclosure. As illustrated in this example, allocating assets in a VR environment can begin with providing 505, to a VR user device 115A, a representation of a virtual casino 130. The virtual casino 130 can comprise one or more virtual asset 135A-135C such as virtual EGMs, virtual table games, etc. A request to utilize the virtual asset 135A can be received 510 from the VR user device 115A and a validation process can be performed 515 on the request to utilize the virtual asset. Details of an exemplary validation process will be described below with reference to FIG. 6.

A determination 520 can be made as to whether the validation process completed successfully, i.e., whether the request was validated. In response to determining 520 the validation process completed successfully, an electronic record 150 associated with the requested virtual asset 135A can be updated 525 to indicate allocation of the virtual asset 135A to a user 120A of the VR user device 115A. For example, allocating the virtual asset 135A to the user 120A of the VR user device 115A can comprise reserving the virtual asset 13A for use by the user 120A of the VR user device 115A. In another example, allocating the virtual asset 135A to the user 120A of the VR user device 115A can comprise defining a personal zone around a virtual representation, i.e., an avatar 140A of the user 120A of the VR user device 115A within the virtual casino 130. In yet another example, allocating the virtual asset 135A to the user 120A of the VR user device 115A can comprise defining boundaries and rules for the virtual asset 135A.

Figure 6:
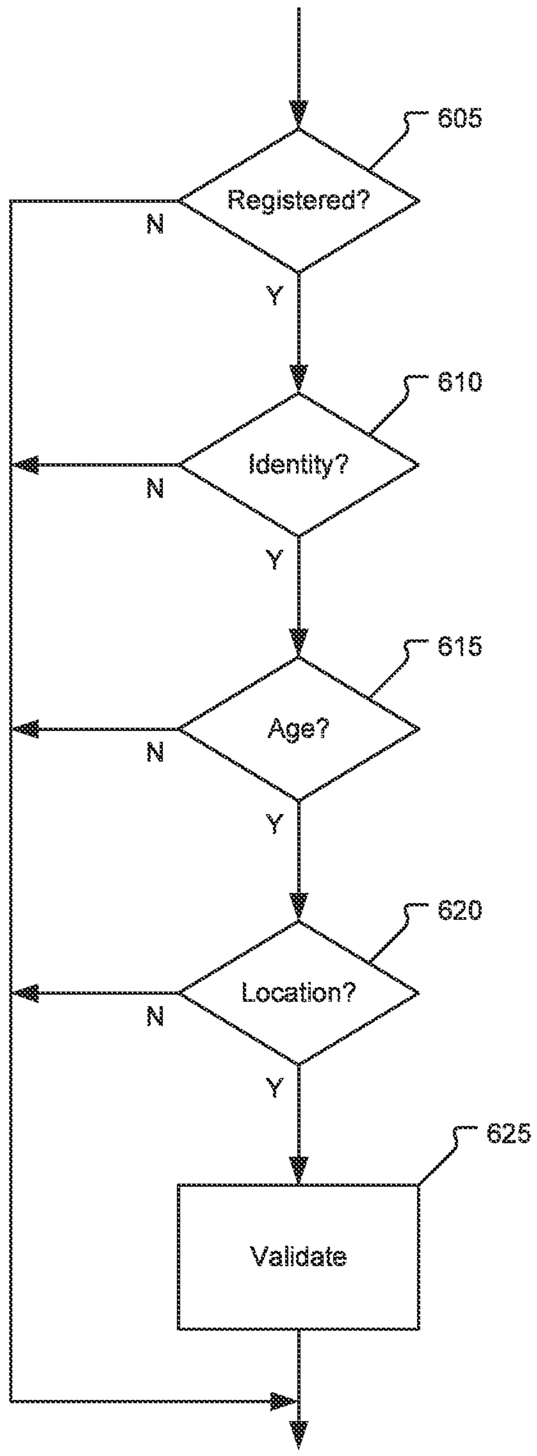
FIG. 6 is a flowchart illustrating additional details of an exemplary process for validating a request for an asset in a virtual or augmented reality gaming environment according to one embodiment of the present disclosure.

FIG. 6 is a flowchart illustrating additional details of an exemplary process for validating a request for an asset in a virtual or augmented reality gaming environment according to one embodiment of the present disclosure. As illustrated in this example, performing the validation process can comprise determining 605 whether the user 120A of the VR user device 115A is registered in the VR system 105. Additionally, or alternatively, performing the validation process can comprise determining 610 whether the user 120A of the VR user device 115A is at least a minimum age required to access the asset, e.g., at least 18 or 21 years old to access a gaming system, depending upon location. Performing the validation process can additionally, or alternatively, comprise verifying 615 an identity of the user 120A of the VR user device 115A. Additionally, or alternatively, the validation process can comprise determining 620 whether the user is physically located in a geographic region which allows legalized gambling or is physically on premise of a casino. In response to an affirmative response to any of these and/or other determinations 605, 610, 615, 620, and/or others, the user 120A can be positively validated 625.

Figure 7:
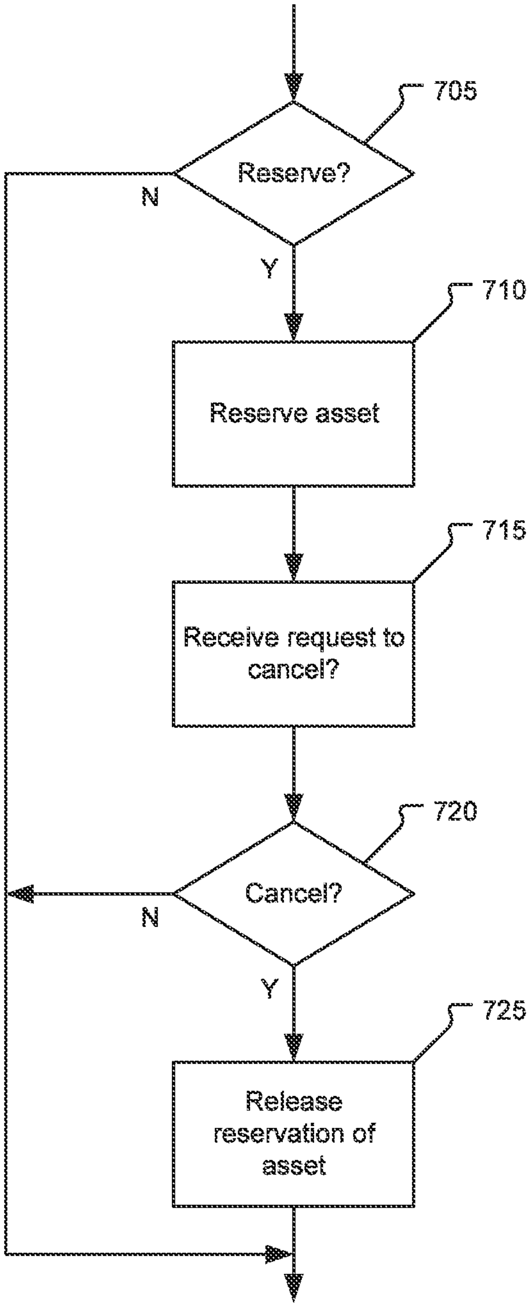
FIG. 7 is a flowchart illustrating additional details of an exemplary process for reserving an asset in a virtual or augmented reality gaming environment according to one embodiment of the present disclosure.

FIG. 7 is a flowchart illustrating additional details of an exemplary process for reserving an asset in a virtual or augmented reality gaming environment according to one embodiment of the present disclosure. As illustrated in this example, the process can begin with determining 705 whether to reserve a requested virtual or real asset. This determination can be based on the request, the user making the request, the asset requested, and/or other factors as descried above. In some cases, the determination 705 can additionally, or alternatively, consider remaining battery life of a user's device. For example, if remaining battery life is less than a wait time or a minimum reservation duration for an asset, the request may be denied. In response to determining 705 to reserve the asset, the requested asset can be reserved 710, i.e., a record associated with the asset can be updated to indicate reservation by the user. For example, the asset can comprise a virtual or real gaming system of a virtual or real casino or other gaming venue and reserving 710 the asset can comprise allowing the user of the user device to sit at the gaming system or allowing the user's avatar to sit a representation of the gaming system in the virtual casino. In another example, reserving 710 the asset can comprise reserving the asset for the user, e.g., for a period of time or for use at a later time, etc.

A request to cancel reservation of the asset can be received 715 and determination 720 can be made as to whether to cancel reservation of the asset. For example, the request can be received 715 from user originally reserving the asset or from another user wanting to use the asset. The determination 720 can be made based on a set of parameters for the user for which the reservation was made and/or a set of parameters for the request. In response to determining 720 the reservation should be canceled, the reservation of the asset can be released 725, i.e., a record associated with the asset can be updated to remove the indication of the reservation.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a user to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a user before enabling that user to place any wagers on any plays of any wagering games. In one example, the central server, central controller, or remote host identifies the user by requiring a user account of the user to be logged into via an input of a unique user name and password combination assigned to the user. The central server, central controller, or remote host may, however, identify the user in any other suitable manner, such as by validating a user tracking identification number associated with the user; by reading a user tracking card or other smart card inserted into a card reader; by validating a unique user identification number associated with the user by the central server, central controller, or remote host; or by identifying the EGM (or personal gaming device), such as by identifying the MAC address or the IP address of the Internet facilitator. In various embodiments, once the central server, central controller, or remote host identifies the user, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for users to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with users.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for allocating assets in a Virtual Reality (VR) environment, the method comprising:

providing, by a VR system, to a VR user device, a representation of a virtual casino, the virtual casino comprising a virtual asset;

receiving, by the VR system, from the VR user device, a request to utilize the virtual asset;

performing, by the VR system, a validation process on the request to utilize the virtual asset; and in response to successful completion of the validation process, updating, by the VR system, an electronic record associated with the virtual asset to indicate allocation of the virtual asset to a user of the VR user device and changing a virtual representation of the virtual asset in the virtual casino to indicate reservation of the virtual asset.

2. The method of claim 1, wherein performing the validation process comprises determining whether the user of the VR user device is registered in the VR system.

3. The method of claim 1, wherein performing the validation process comprises determining whether the user of the VR user device is at least a minimum age.

4. The method of claim 1, wherein performing the validation process comprises verifying an identity of the user of the VR user device.

5. The method of claim 1, wherein allocating the virtual asset to the user of the VR user device comprises reserving the virtual asset for use by the user of the VR user device.

6. The method of claim 1, wherein allocating the virtual asset to the user of the VR user device comprises defining, by the VR system, a personal zone around a virtual representation of the user of the VR user device within the virtual casino.

7. The method of claim 1, wherein allocating the virtual asset to the user of the VR user device comprises defining, by the VR system, boundaries and rules for the virtual asset.

8. A Virtual Reality (VR) system comprising:

a processor; and a memory coupled with and readable by the processor and storing therein a set of instructions which, when executed by the processor, causes the processor to:

provide, to a VR user device, via a communications network, a representation of a virtual casino, the virtual casino comprising a virtual asset;

receive, from the VR user device, via the communications network, a request to utilize the virtual asset;

perform validation process on the request to utilize the virtual asset; and in response to successful completion of the validation process, update an electronic record associated with the virtual asset to indicate allocation of the virtual asset to a user of the VR user device and changing a virtual representation of the virtual asset in the virtual casino to indicate reservation of the virtual asset.

9. The VR system of claim 8, wherein the virtual asset comprises a seat at a virtual gaming system in the virtual casino, wherein allocating the virtual asset to the user of the VR user device comprises allowing an avatar representing the user of the user device in the virtual casino to sit at the virtual gaming system.

10. The VR system of claim 8, wherein the instructions further cause the processor to maintain an electronic record defining an account for the user of the VR user device and wherein performing the validation process is based on the maintained electronic record.

11. The VR system of claim 8, wherein the instructions further cause the processor to:

define a personal zone around an avatar representing the user of the VR user device within the virtual casino; and prevent avatars of other users in the virtual casino from entering the defined personal zone around the avatar representing the user of the VR user device.

12. The VR system of claim 11, wherein a size of the personal zone around the avatar representing the user of the VR user device is determined based on predefined preferences for the user of the VR user device.

13. The VR system of claim 11, wherein a size of the personal zone around the avatar representing the user of the VR user device is determined based on a status for the user of the VR user device.

14. The VR system of claim 11, wherein a size of the personal zone around the avatar representing the user of the VR user device is determined based on a history for the user of the VR user device.

15. The VR system of claim 11, wherein a size of the personal zone around the avatar representing the user of the VR user device is determined based on a location of the avatar for the user of the VR user device in the virtual casino.

16. An Augmented Reality (AR) system comprising:

a processor; and a memory coupled with and readable by the processor and storing therein a set of instructions which, when executed by the processor, causes the processor to:

provide, to an AR user device, via a communications network, an augmented representation of a gaming venue, the gaming venue comprising an asset;

receive, from the AR user device, via the communications network, a request to utilize the asset;

perform validation process on the request to utilize the asset; and in response to successful completion of the validation process, update an electronic record associated with the asset to indicate allocation of the asset to a user of the AR user device and changing a virtual representation of the virtual asset in the virtual casino to indicate reservation of the virtual asset.

17. The AR system of claim 16, wherein the asset comprises a gaming system of the gaming venue and wherein allocating the asset to the user of the user device comprises allowing the user of the user device to sit at the gaming system.

18. The AR system of claim 16, wherein the asset comprises a gaming system of the gaming venue and wherein allocating the asset to the user of the AR user device comprises reserving the gaming system for the user of the AR user device.

19. The AR system of claim 18, wherein reserving the gaming system for the user of the AR user device is further based on a set of parameters for the user of the AR user device.

20. The AR system of claim 18, wherein the instructions further cause the processor to:

receive a request to cancel reservation of the asset for the user of the AR user device; and determine whether to cancel reservation of the asset for the user of the AR user device based on a set of parameters for the user of the AR user device and a set of parameters for the request.

* * * * *